A. HIGLEY,

Assignor to HIGLEY CAR JOURNAL CO.

Car Axle Box.

No. 9,295. Reissued July 13, 1880.

Witnesses

J. H. Lapham

Henry B. Sheridan

Inventor.

Aaron Higley per M. A. Burridge

Atty

UNITED STATES PATENT OFFICE.

AARON HIGLEY, OF CLEVELAND, OHIO, ASSIGNOR TO HIGLEY CAR JOURNAL COMPANY.

CAR-AXLE BOX.

SPECIFICATION forming part of Reissued Letters Patent No. 9,295, dated July 13, 1880.

Original No. 86,543, dated February 2, 1869. Reissue No. 5,453, dated June 17, 1873. Application for reissue filed February 6, 1880.

*To all whom it may concern:*

Be it known that I, AARON HIGLEY, of Cleveland, in the county of Cuyahoga and State of Ohio, formerly of South Bend, in the county of St. Joseph and State of Indiana, have invented certain new and useful Improvements in Railroad-Car Axle-Boxes, and in the means employed for connecting the same to the car; and I do hereby declare that the following is a full, clear, and complete description thereof, reference being had to the accompanying drawings, making part of the same.

Figure 1:
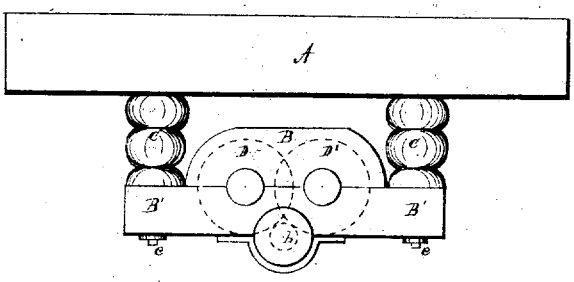
Figure 2:
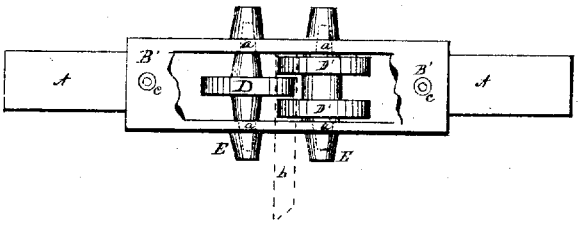
Figure 3:
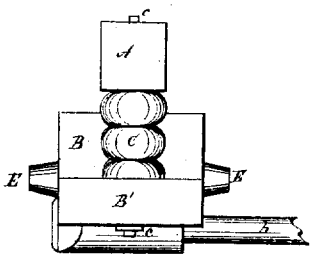

Figure 1 is a side view of the box. Fig. 2 is a view of the under side. Fig. 3 is an end view.

Like letters of reference refer to like parts in the several views.

I am aware that friction-rollers have been known and used for journal-bearings, and these I do not claim, separately considered; but what distinguishes my improvement and is the nature thereof consists in interlapping friction rolls or rollers arranged in a frame or housing, and forming a box or bearing for railway-car axle-journals, &c.

In Fig. 1, A represents a car or truck sill, to the under side of which is secured the journal-box case B by means of bolts passing through the arms and connected to the sill, with one or more springs, C, interposed between them, and on which springs the sill rests. Said box is so constructed and arranged that one side and the bottom can be removed for the admission of the friction-rollers D D′, which, as will be seen, are arranged transversely in the box. The journals of said rollers have their bearings in the sides of the box, extending through into the projections E. It will be observed that the roller D′ is double, or two rollers on one shaft, and so arranged on the shaft that they have a space between them, into which the roller D is received, as shown in the drawings, Fig. 2, also indicated by the dotted lines in Fig. 1.

In Figs. 2 and 3, *b* is the car-axle, upon which, as will be seen in Fig. 2, rest the rollers D D′, said rollers forming the seat or bearing for the axle-journal. The weight and friction are equally distributed upon the journals of the said rollers and prevent the bearings or journal-box from twisting or turning out of line with the axles; also prevent the axle-journals from wearing unequally, or cutting by the rollers and twisting out of line.

By the interlapping of the rollers the journals thereof are brought more directly over the center of the axles, thereby reducing the friction on all the journals.

In the application of this journal-box to the car a pedestal may or may not be used to connect it to the sill. This box is connected to the sill of the car or truck by means of the bolts or rods *c c*, which are fastened at the upper ends to the sill, the lower ends extending through the arms B′ of the box or frame, the sill resting directly upon the springs and arms.

The rods or bolts are so arranged in relation to the springs and adjusted in the arms B′ as to allow the said bolts to work or move easily in the arms, thereby causing the car to have an easy riding movement independent of the jolting of the trucks.

What I claim as my improvement, and desire to secure by Letters Patent, is—

1. The interlapping friction rolls or rollers D D′, case B, arms B′, and springs C, all arranged to operate in the manner as and for the purpose substantially described.

2. The interlapping friction-rollers D D′, having two points of bearing for the axle upon one roller and one point of bearing upon the other, or the equivalent of the same, the object being to throw an equal bearing upon the journals of the friction-rollers, substantially as and for the purpose specified.

3. The box having the arms B′ secured to the car by bolts rigidly attached to the sill A and passing loosely through said arms and the interposed spring or springs, constructed and arranged substantially as and for the purpose set forth.

AARON HIGLEY.

Witnesses:
J. H. BURRIDGE,
CARL SEYLER.